United States Patent
Guo et al.

(10) Patent No.: US 9,627,965 B2
(45) Date of Patent: Apr. 18, 2017

(54) POWER CONVERTER AND POWER SUPPLYING METHOD THEREOF

(71) Applicant: DELTA ELECTRONICS, INC., Taoyuan Hsien (TW)

(72) Inventors: Xing-Kuan Guo, Taoyuan Hsien (TW); Li-Tao Xia, Taoyuan Hsien (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 444 days.

(21) Appl. No.: 14/295,090

(22) Filed: Jun. 3, 2014

(65) Prior Publication Data

US 2014/0354058 A1   Dec. 4, 2014

(30) Foreign Application Priority Data

Jun. 4, 2013 (CN) .......................... 2013 1 0218924

(51) Int. Cl.
*H02J 1/10* (2006.01)
*H02M 3/155* (2006.01)
(Continued)

(52) U.S. Cl.
CPC ........... *H02M 3/155* (2013.01); *B60L 11/005* (2013.01); *B60L 11/185* (2013.01);
(Continued)

(58) Field of Classification Search
CPC ............... Y10T 307/549; Y02T 90/127; Y02T 10/7225; H02M 3/155; H02M 2001/0093;
(Continued)

(56) References Cited

U.S. PATENT DOCUMENTS 4,479,083 A * 10/1984 Sullivan ................ H02J 7/1423
320/123
6,101,108 A   8/2000 Wittenbreder, Jr.
(Continued)

FOREIGN PATENT DOCUMENTS

CA   2746304   1/2013
CN   1560988   1/2005
(Continued)

*Primary Examiner* — Jared Fureman
*Assistant Examiner* — Duc M Pham
(74) *Attorney, Agent, or Firm* — CKC & Partners Co., Ltd.

(57) ABSTRACT

A power converter includes a DC/DC converting circuit and a first energy storage element. The DC/DC converting circuit includes a first output terminal and a second output terminal. The first energy storage element includes a first terminal and a second terminal. The first output terminal of the DC/DC converting circuit is electrically connected to one terminal of an external load. The first terminal of the first energy storage element is electrically connected to the second output terminal of the DC/DC converting circuit. The second terminal of the first energy storage element is electrically connected to the other terminal of the external load. The DC/DC converting circuit is configured to provide a variable electric power. The power converter provides the power supply according to the DC/DC converting circuit and the first energy storage element, and the variable electric power is less than the power required by the external load.

21 Claims, 5 Drawing Sheets

(51) Int. Cl.
*H02M 3/00* (2006.01)
*B60L 11/00* (2006.01)
*B60L 11/18* (2006.01)
*H02J 7/00* (2006.01)
*H02M 1/00* (2006.01)

(52) U.S. Cl.
CPC ......... *B60L 11/1868* (2013.01); *H02J 7/0024* (2013.01); *H02J 7/0065* (2013.01); *H02M 3/00* (2013.01); *B60L 2210/12* (2013.01); *B60L 2210/14* (2013.01); *H02M 2001/0093* (2013.01); *Y02T 10/7005* (2013.01); *Y02T 10/7022* (2013.01); *Y02T 10/7066* (2013.01); *Y02T 10/7072* (2013.01); *Y02T 10/7225* (2013.01); *Y02T 10/7233* (2013.01); *Y02T 90/121* (2013.01); *Y02T 90/127* (2013.01); *Y02T 90/128* (2013.01); *Y02T 90/14* (2013.01); *Y10T 307/549* (2015.04)

(58) Field of Classification Search
CPC .... B60L 11/005; B60L 2210/12; H02J 7/0024
USPC .......................................................... 307/52
See application file for complete search history.

(56) References Cited

U.S. PATENT DOCUMENTS

| | | | | |
|---|---|---|---|---|
| 2003/0117019 | A1* | 6/2003 | Furukawa | B60L 1/02 |
| | | | | 307/10.6 |
| 2005/0230976 | A1* | 10/2005 | Yang | B60K 6/442 |
| | | | | 290/4 R |
| 2010/0090529 | A1* | 4/2010 | Yoshida | H02J 7/0068 |
| | | | | 307/31 |

FOREIGN PATENT DOCUMENTS

| | | | | |
|---|---|---|---|---|
| CN | 101401277 | | 4/2009 | |
| CN | 201789415 | | 4/2011 | |
| CN | 102545709 | | 7/2012 | |
| CN | 202818129 | | 3/2013 | |
| EP | 2006974 | | 12/2008 | |
| EP | 2573899 | | 3/2013 | |
| JP | 2005204421 | * | 1/2004 | ............. H02M 3/00 |
| TW | 200937855 | | 9/2009 | |
| TW | 201135392 | | 10/2011 | |
| TW | 201203817 | | 1/2012 | |
| TW | 201308856 | | 2/2013 | |
| WO | 2013010270 | | 1/2013 | |

* cited by examiner

POWER CONVERTER AND POWER SUPPLYING METHOD THEREOF

RELATED APPLICATIONS

This application claims priority to China Application Serial Number 201310218924.4, filed Jun. 4, 2013, which is herein incorporated by reference.

BACKGROUND

Field of Invention

The embodiment of the present invention relates generally to a converter and a corresponding power supplying method, and more particularly, to a power converter and a method for providing a power supply by the power converter.

Description of Related Art

Electric vehicles are drawing more and more interests in recent years as they are more ecologically friendly compared with traditional gasoline powered vehicles. In particular, electric buses are booming in the development of urban public transportation.

Being promising in many aspects, the energy storage and charging of electric buses still remain a challenge. One economical way is to charge the electric bus batteries when the bus stops at a station, with the intermittent charging mode featured by high charging power during a short period of time.

However, the above intermittent charging solution requires power converters with large capacity and size to convert the input charging power into the load power of the electric bus batteries. For example, when the traditional power converters are used for controlling the charging and discharging of energy storage devices, they usually perform the full-power conversion. Thus, the power converters' cost and size will increase drastically.

There has been much effort in trying to find solutions to the aforementioned problems. Nevertheless, there is still a need to improve the existing apparatuses and techniques in the art.

SUMMARY

The following presents a simplified summary of the disclosure in order to provide a basic understanding to the reader. This summary is not an extensive overview of the disclosure and it does not identify key/critical elements of the present invention or delineate the scope of the present invention.

In view of the above, the present disclosure provides a novel direct current to direct current (DC/DC) charging technique. The DC/DC charging technique employs partial power transforming technique to transform partial power of the entire power which is transmitted to a load. Such DC/DC charging technique can decrease capacity of power converters, decrease rated values of devices, decrease size, production cost, and consumption of the system, and enhance charging efficiency of the system.

The present disclosure provides a power converter and a method for providing a power supply by the power converter, which address the problems faced in the prior art.

One aspect of the embodiment of the present invention provides a power converter that comprises a DC/DC converting circuit and a first energy storage element. Further, the DC/DC converting circuit comprises a first output terminal and a second output terminal, and the first energy storage element comprises a first terminal and a second terminal. In structure, the first output terminal of the DC/DC converting circuit is electrically connected to one terminal of the external load, the first terminal of the first energy storage element is electrically connected to the second output terminal of the DC/DC converting circuit, and the second terminal of the first energy storage element is electrically connected to the other terminal of the external load. In operation, the DC/DC converting circuit is configured to provide a variable electric power, the power converter provides the power supply for the external load according to the DC/DC converting circuit and the first energy storage element, and the variable electric power is less than the power required by the external load.

Another aspect of the present invention is directed to a power converter which comprises a DC/DC converting circuit, a first energy storage element and switch. Further, the DC/DC converting circuit comprises a first output terminal and a second output terminal, the first energy storage element comprises a first terminal and a second terminal, and the switch comprises a first connecting terminal, a second connecting terminal and a third connecting terminal. In structure, the first output terminal of the DC/DC converting circuit is electrically connected to one terminal of the external load, the first terminal of the first energy storage element is electrically connected to the second output terminal of the DC/DC converting circuit, the first connecting terminal of the switch is electrically connected to the second output terminal of the DC/DC converting circuit, the second connecting terminal of the switch is electrically connected to the second terminal of the first energy storage element, and the third connecting terminal of the switch is electrically connected to the other terminal of the external load. In operation, the DC/DC converting circuit is configured to provide a variable electric power, and the power converter provides a two-stage continuous power supply to the external load by the switching operation of the switch.

Another aspect of the present invention is directed to a method for providing a power supply by a power converter, the power converter comprising a DC/DC converting circuit and a first energy storage element serially connected to the output terminal of the DC/DC converting circuit. The method comprises:

providing a variable electric power through the DC/DC converting circuit;
providing a switch, of which the first connecting terminal and the third connecting terminal is electrically connected, thereby allowing the DC/DC converting circuit solely to provide the power supply to the external load;
detecting the voltage across the external load; and
when the voltage across the external load is equal to or greater than a predetermined voltage, the third connecting terminal of the switch is switched to electrically connect with the second connecting terminal, thereby allowing the DC/DC converting circuit together with the first energy storage element to provide the power supply to the external load.

Many of the attendant features and advantages of the present disclosure will become better understood with reference to the following detailed description.

BRIEF DESCRIPTION OF THE DRAWINGS

The invention can be more fully understood by reading the following detailed description of the embodiments, with reference made to the accompanying drawings as follows.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Specifically, as used herein and in the claims, the singular forms "a" and "an" include the plural reference unless the context clearly indicates otherwise. Also, as used herein and in the claims, the terms "at least one" and "one or more" have the same meaning and include one, two, three, or more.

Moreover, as used herein, the terms "couple" or "connect" are referring to the physical or electrical contacts between two or more elements with each other, either directly or indirectly, or the mutual operation or interaction between two or more elements.

Figure 1A:
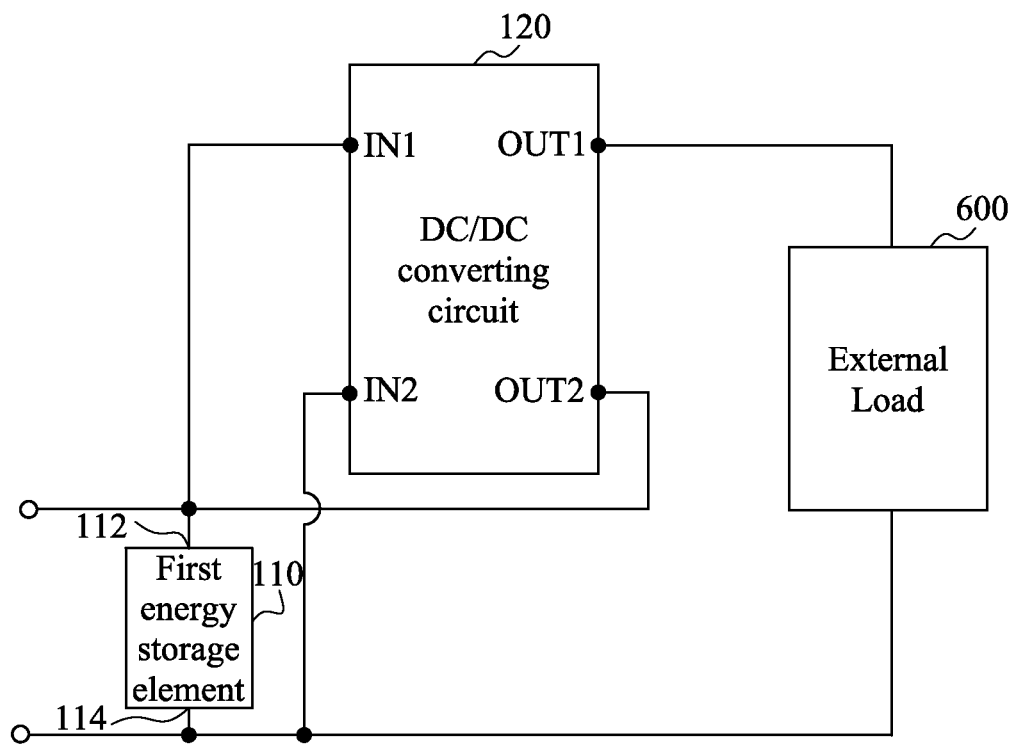
FIG. 1A schematically shows a power converter according to one embodiment of the present invention.

To address the problems existing in the prior art, the present invention provides a power converter which is schematically shown in FIG. 1A. As illustrated in FIG. 1A, the power converter comprises a first energy storage element 110 and a DC/DC converting circuit 120. The DC/DC converting circuit 120 comprises a first output terminal OUT1 and a second output terminal OUT2, and the first energy storage element 110 comprises a first terminal 112 and a second terminal 114.

The first output terminal OUT1 of the DC/DC converting circuit 120 is electrically connected to one terminal of the external load 600, the first terminal 112 of the first energy storage element 110 is electrically connected to the second output terminal OUT2 of the DC/DC converting circuit 120, and the second terminal 114 of the first energy storage element 110 is electrically connected to the other terminal of the external load 600.

The DC/DC converting circuit 120 is configured to provide a variable electric power. The power converter provides the power supply for the external load 600 according to the DC/DC converting circuit 120 and the first energy storage element 110. The variable electric power of the DC/DC converting circuit 120 is less than the power required by the external load 600.

In this way, since the first energy storage element 110 is electrically connected to the output portion of the DC/DC converting circuit 120 in series, the power converter can use the first energy storage element 110 and the DC/DC converting circuit 120 to provide the power supply for the external load 600. Consequently, the variable electric power provided by the DC/DC converting circuit 120 is not necessarily equal to the power required by the external load 600; in fact, the variable electric power provided by the DC/DC converting circuit 120 is less than the power required by the external load 600. Accordingly, the power level of the DC/DC converting circuit 120 provided by embodiments of the present invention can be lowered, thereby decreasing the size and cost of the DC/DC converting circuit 120.

With further reference to FIG. 1A, in one implementation, the DC/DC converting circuit 120 further comprises a first input terminal IN1 and a second input terminal IN2. The first terminal 112 of the first energy storage element 110 is electrically connected to the first input terminal IN1 of the DC/DC converting circuit 120, and the second terminal 114 of the first energy storage element 110 is electrically connected to the second input terminal IN2 of the DC/DC converting circuit 120.

Figure 1B:
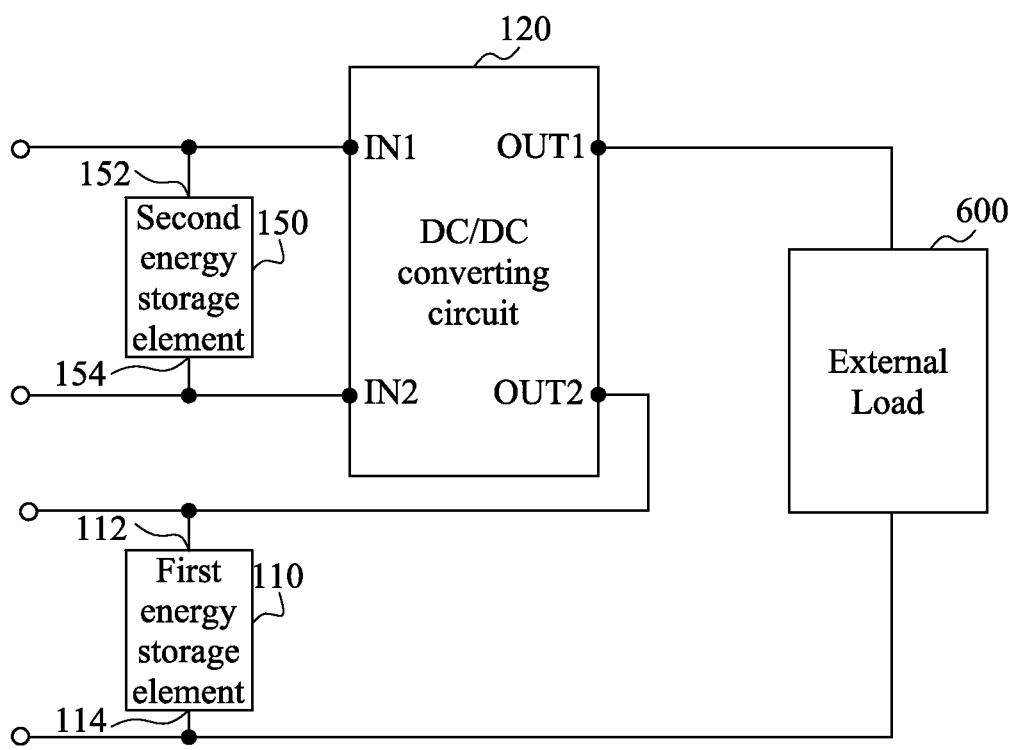
FIG. 1B schematically shows a power converter according to another embodiment of the present invention.

In another implementation of the present invention, with reference to FIG. 1B, which schematically illustrates a power converter according to another embodiment of the present invention, the power converter further comprises a second energy storage element 150 which, in turn, comprises a first terminal 152 and a second terminal 154. The first terminal 152 of the second energy storage element 150 is electrically connected to the first input terminal IN1 of the DC/DC converting circuit 120, and the second terminal 154 is electrically connected to the second input terminal IN2 of the DC/DC converting circuit 120. In this embodiment, as shown in FIG. 1B, the second energy storage element 150 can be used as the input source of the DC/DC converting circuit 120; additionally, the second energy storage element 150 and the first energy storage element 110 are electrically isolated.

Yet another implementation will be described with reference to FIG. 1C which schematically illustrates a power converter according to yet another embodiment of the present invention. Compared with the power converter of FIG. 1B, in the power converter of this embodiment, the second terminal 154 of the second energy storage element 150 is electrically connected to the first terminal 112 of the first energy storage element 110. In other words, the second energy storage element 150 and the first energy storage element 110 are electrically connected; that is, these two energy storage elements are electrically non-isolated.

Figure 1C:
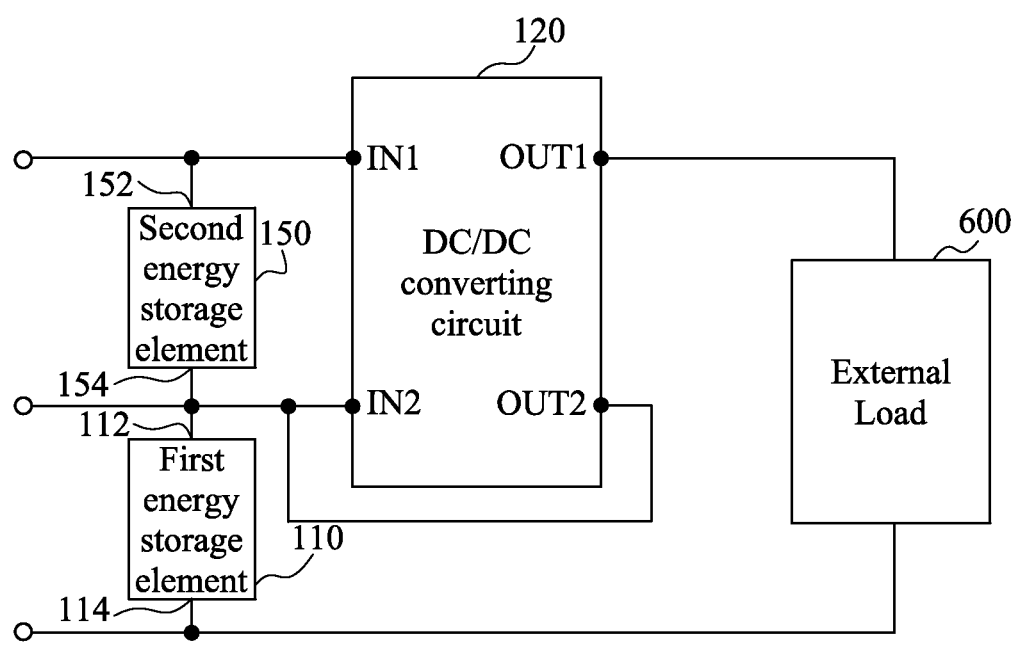
FIG. 1C schematically shows a power converter according to yet another embodiment of the present invention.

In certain implementations, with reference to both FIGS. 1B and 1C, the voltage across the second energy storage element 150 is greater than the voltage across the first energy storage element 110.

In implementing the present invention, the first energy storage element 110 may be a rechargeable battery or a super capacitor. Additionally, the second energy storage element 150 may be a rechargeable battery or a super capacitor; however, the present invention is not limited thereto, and the skilled in the art may choose suitable elements for implementing the present disclosure.

Figure 2A:
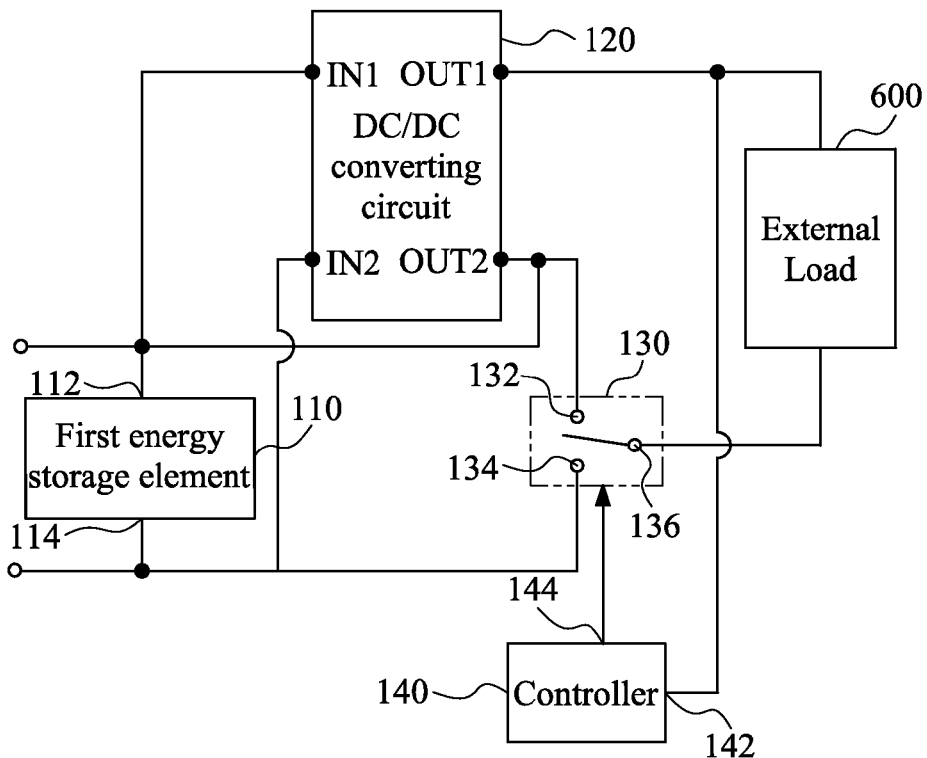
FIG. 2A schematically shows a power converter according to another embodiment of the present invention.

During an initial stage of providing power supply for the external load 600, to avoid the first energy storage element 110 from providing a supply voltage greater than the voltage of the external load 600 and thereby causing the current on the external load 600 from getting out of control, embodiments of the present invention further provide a circuit structure which is illustrated in FIG. 2A.

As illustrated in FIG. 2A, the power converter comprises a DC/DC converting circuit 120, a first energy storage element 110 and a switch 130. The DC/DC converting circuit 120 comprises a first output terminal OUT1 and a second output terminal OUT2, the first energy storage element 110 comprises a first terminal 112 and a second terminal 114, the switch 130 comprises a first connecting terminal 132, a second connecting terminal 134 and a third connecting terminal 136.

The first output terminal OUT1 of the DC/DC converting circuit 120 is electrically connected to one terminal of the external load 600, the first terminal 112 of the first energy storage element 110 is electrically connected to the second output terminal OUT2 of the DC/DC converting circuit 120, the first connecting terminal 132 of the switch 130 is electrically connected to the second output terminal OUT2 of the DC/DC converting circuit 120, the second connecting terminal 134 of the switch 130 is electrically connected to the second terminal 114 of the first energy storage element 110, and the third connecting terminal 136 of the switch 130 is electrically connected to the other terminal of the external load 600.

The DC/DC converting circuit 120 is configured to provide a variable electric power, and the power converter provides a two-stage continuous power supply to the external load 600 by the switching operation of the switch 130. In this way, since the power converter provides a two-stage continuous power supply to the external load 600, the external load 600 can tolerate the supply voltage provided by the first energy storage element 110, and after that, the first energy storage element 110 and the DC/DC converting circuit 120 are used jointly to provide power supply for the external load 600; consequently, the problem of out-of-control current on the external load 600 can be avoided.

Further, the above-mentioned provision of a two-stage continuous power supply by the switching operation of the switch 130 is exemplified below. When the third connecting terminal 136 and the first connecting terminal 132 of the switch 130 are electrically connected, the power converter provides the power supply for the external load 600 by use of the variable electric power; and when the third connecting terminal 136 and the second connecting terminal 134 of the switch 130 are electrically connected, the power converter provides the power supply for the external load 600 according to the DC/DC converting circuit and the first energy storage element.

Further, to more precisely avoid said out-of-control current on the external load 600, embodiments of the present invention further comprise a controller 140 in the circuit structure illustrated in FIG. 2A. Such an implementation is detailed below.

The power converter further comprises a controller 140 which, in turn, comprises a detection terminal 142 and a control terminal 144. The detection terminal 142 is configured to detect the voltage across the external load 600. The control terminal 144 is electrically connected to the switch 130. When the voltage across the external load 600 is equal to or greater than a predetermined voltage (for example, a default voltage), the control terminal 144 outputs a control signal to the switch 130, thereby allowing the second connecting terminal 134 and the third connecting terminal 136 of the switch 130 to be electrically connected; and when the voltage across the external load 600 is less than the predetermined voltage (for example, a default voltage), the control terminal 144 outputs another control signal to the switch 130, thereby allowing the first connecting terminal 132 and the third connecting terminal 136 of the switch 130 to be electrically connected. In this way, by using the controller 140 to detect the voltage across the external load 600 and to control the switch 130 depending on the result of this detection, it is possible to more precisely prevent the current on the external load 600 from getting out of control.

With further reference to FIG. 2A, the first terminal 112 of the first energy storage element 110 is electrically connected to the first input terminal IN1 of the DC/DC converting circuit 120, and the second terminal 114 of the first energy storage element 110 is electrically connected to the second input terminal IN2 of the DC/DC converting circuit 120.

Figure 2B:
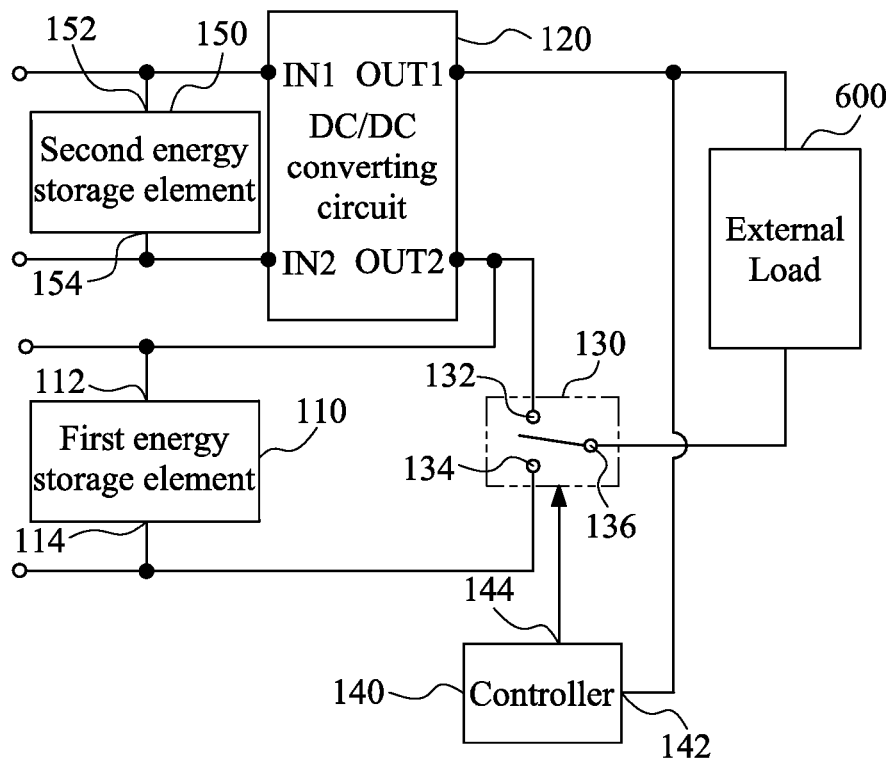
FIG. 2B schematically shows a power converter according to yet another embodiment of the present invention.

Similarly, to avoid the current on the external load 600 from getting out of control, embodiments of the present invention further provide the circuit structure illustrated in FIG. 2B. Compared with FIG. 2A, the power converter of FIG. 2B further comprises a second energy storage element 150 which, in turn, comprises a first terminal 152 and a second terminal 154. The first terminal 152 is electrically connected to the first input terminal IN1 of the DC/DC converting circuit 120, and the second terminal 154 is electrically connected to the second input terminal IN2 of the DC/DC converting circuit 120. In this embodiment, as shown in FIG. 2B, the second energy storage element 150 can be used as the input electric source for the DC/DC converting circuit 120; additionally, the second energy storage element 150 and the first energy storage element 110 are electrically isolated.

Figure 2C:
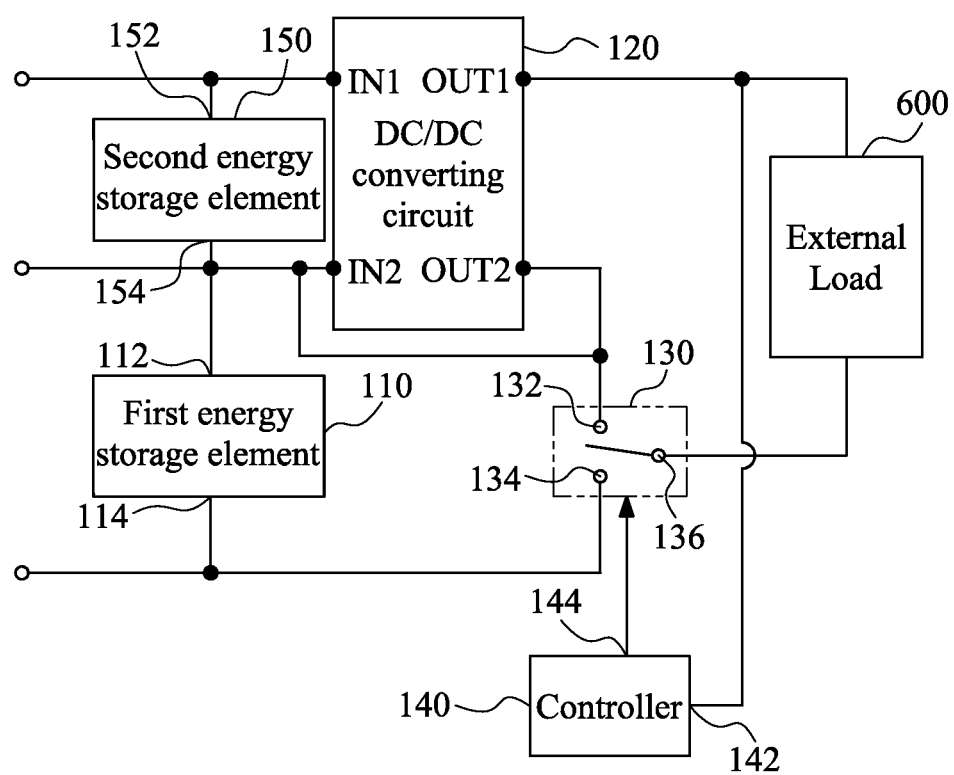
FIG. 2C schematically shows a power converter according to still another embodiment of the present invention.

FIG. 2C schematically illustrates a power converter according to yet another embodiment of the present invention. In comparison with the power converter of FIG. 2B, in the present power converter, the second terminal 154 of the second energy storage element 150 is electrically connected to the first terminal 112 of the first energy storage element 110. In other words, the second energy storage element 150 and the first energy storage element 110 are electrically connected; that is, these two energy storage elements are electrically non-isolated.

Figure 2D:
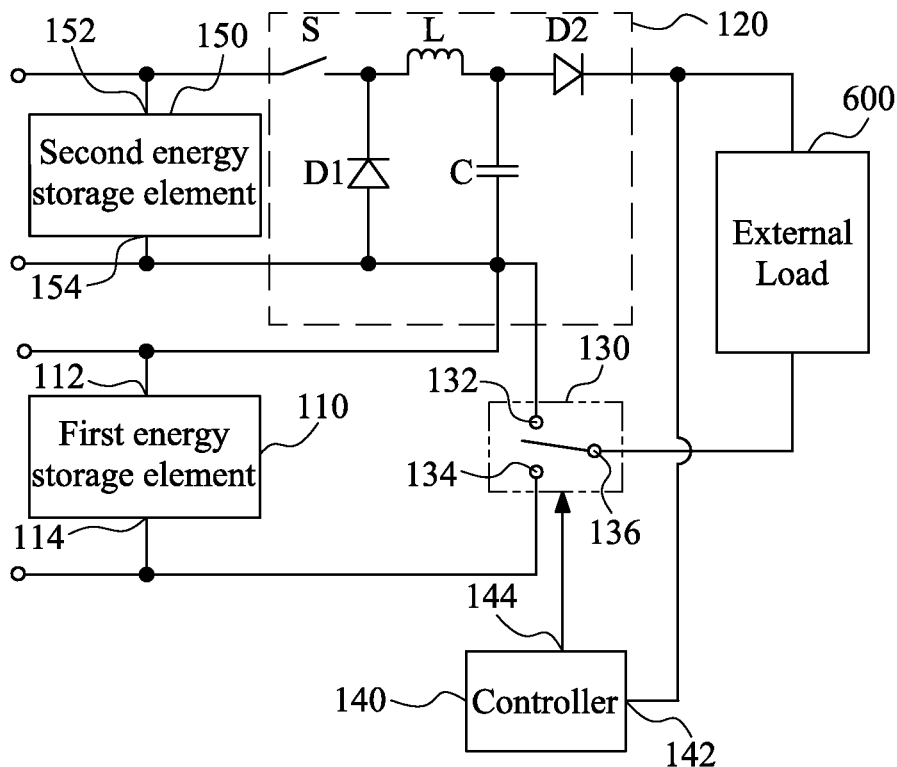
FIG. 2D schematically shows a circuit of a DC/DC converting circuit of the power converter shown in FIG. 2B.

Another implementation is illustrated in FIG. 2D which shows the circuit of a power converter of the DC/DC converting circuit 120 of FIG. 2B. As illustrated in FIG. 2D, the DC/DC converting circuit 120 may be a buck circuit which comprises a power switch S, a first diode D1, an inductor L, a capacitor C and a second diode D2. The power switch S has one terminal electrically connected to the first terminal 152 of the second energy storage element 150, the anode of the first diode D1 is electrically connected to the second terminal 154 of the second energy storage element 150, the cathode of the first diode D1 is electrically connected to the other terminal of the power switch S, one terminal of the inductor L is electrically connected to the cathode of the first diode D1, one terminal of the capacitor C is electrically connected to the other terminal of the inductor L, the other terminal of the capacitor C is electrically connected to the second terminal 154 of the second energy storage element 150, the anode of the second diode D2 is electrically connected to the other terminal of the inductor L, and the cathode of the second diode D2 is electrically connected to external load 600.

In one implementation, the voltage across the second energy storage element 150 is greater than the voltage across the first energy storage element 110. In implementing the present invention, the first energy storage element 110 may be a rechargeable battery or a super capacitor. Moreover, the second energy storage element 120 may be a rechargeable battery or a super capacitor; however, the present invention is not limited thereto, and the skilled in the art may choose suitable elements for implementing the present disclosure.

Figure 3:
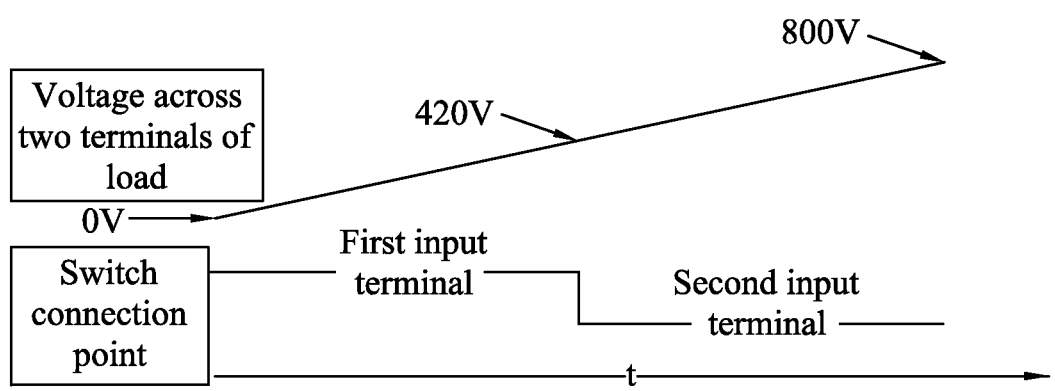
FIG. 3 is a line diagram showing the change in the voltage across an external load connected to a power converter according to another embodiment of the present invention.

To facilitate the understanding of the operating principles of the power converter of embodiments of the present invention, reference is made to FIG. 3 which is a line graph illustrating the change in the voltage across an external load connected to a power converter according to another embodiment of the present invention.

As illustrated in FIG. 3, assuming that the first energy storage element 110 provides a voltage of 400V, when the controller 140 detects that the voltage across the external load 600 is equal to or greater than the supply voltage of the first energy storage element 110 (for example, when the voltage across the load is 420V), the controller 140 outputs a control signal to the switch 130, and the switch 130, when receiving the control signal, switches from the first input terminal 132 to the second input terminal 134, thereby allowing the second terminal 114 of the first energy storage element 110 and the other terminal of the external load 600 to be electrically connected, and hence, the first energy storage element 110 together with the DC/DC converting circuit 120 provide the power supply for the external load 600. In this way, it is possible to ensure that the first energy storage element 110 together with the DC/DC converting circuit 120 only provide the power supply for the external load 600 after it is determined that the external load 600 can tolerate the supply voltage provided by the first energy storage element 110; consequently, the problem of the out-of-control current on the external load 600 can be avoided.

Moreover, as shown in the line graph of FIG. 3 illustrating the change in the voltage of the load voltage, the power converter of the present invention adopts a staged strategy while supplying electricity to the external load. Specifically, from the voltage range of 0 to 420V, the DC/DC converting circuit 120 alone is used to provide power supply for the external load 600, thereby allowing load the voltage across the external to increase from the voltage range of 0V to 420V. From the range of 420V to 800V, the DC/DC converting circuit 120 and the first energy storage element 110 are serially connected so that they supply electricity to the external load 600 jointly, thereby allowing the voltage across the external load to continuously rise from 420V to 800V. In view of the foregoing, in the voltage range of 420V to 800V, the electric power outputted by the DC/DC converting circuit 120 is not necessarily equal to the electric power required by the external load 600. In other words, in the present invention, by electrically connecting the energy storage element to the output terminal of the DC/DC converting circuit 120 in series, the electric power from the DC/DC converting circuit 120 is used as a portion of the electric power required by the external load 600; consequently, it is possible to decrease the power level of the DC/DC converting circuit 120 and reduce the design cost thereof.

In addition to the above-mentioned power converters, the present invention further provides a method for providing a power supply by a power converter. The power converter comprises a DC/DC converting circuit and a first energy storage element serially connected to the output terminal of the DC/DC converting circuit. To facilitate the understanding of the method for providing the power supply by the power converter, reference is made to FIG. 1A as an example of a power converter to which the method for providing the power supply by the power converter is applied. Said method for providing the power supply by the power converter comprises the following steps: providing a variable electric power through the DC/DC converting circuit; providing a switch, of which the first connecting terminal and the third connecting terminal is electrically connected, thereby allowing the DC/DC converting circuit solely to provide the power supply to the external load; detecting the voltage across the external load; and when the voltage across the external load is equal to or greater than a predetermined voltage (for example, a default voltage), the third connecting terminal of the switch is switched to electrically connect with the second connecting terminal, thereby allowing the DC/DC converting circuit together with the first energy storage element to provide the power supply for the external load.

In this way, the method for providing the power supply by the power converter can charge the external load 600 by serially connecting the first energy storage element 110 and the output terminal of the DC/DC converting circuit 120 at the same time. Accordingly, the variable electric power provided by the DC/DC converting circuit 120 is not necessarily equal to the power required by the external load 600; in fact, the variable electric power provided by the DC/DC converting circuit 120 is less than the power required by the external load 600. Therefore, the method for providing the power supply by the power converter according to embodiments of the present invention may decrease the power level of the DC/DC converting circuit 120, and decrease the cost and size of the DC/DC converting circuit 120. Moreover, the power level of the DC/DC converting circuit 120 may be lowered.

For example, only when the voltage across the external load 600 is equal to or greater than a predetermined voltage (for example, a default voltage) would the power converter supply electricity to the external load 600 via the serially connected first energy storage element 110 and the DC/DC converting circuit 120. In other words, said process steps are intended to ensure that it is only when the external load 600 can tolerate the supply voltage provided by the first energy storage element 110 that the first energy storage element 110 and the DC/DC converting circuit 120 will be serially connected to thereby provide power supply for the external load 600 jointly; consequently, the problem of the current on the external load 600 getting out of control may be avoided.

In implementing the present invention, the first energy storage element 110 can be a rechargeable battery or a super capacitor; however, the present invention is not limited thereto, and persons having ordinary skill in the art may choose suitable elements for implementing the present disclosure.

Further, to more precisely avoid said out-of-control current on the external load 600, the method for providing the power supply by the power converter according to embodiments of the present invention further comprises the following step(s): using the controller to detect the voltage across the external load 600, wherein when the controller 140 detects that the voltage across the external load 600 is equal to or greater than a predetermined voltage (for example, a default voltage), the controller 140 outputs a control signal to the switch 130, and when switch 130 receives the control signal, it switches the third connecting terminal 136 to be electrically connected to the second connecting terminal 134. In this case, the first energy storage element 110 and the output portion of the DC/DC converting circuit 120 are serially connected, and the first energy storage element 110 together with the DC/DC converting circuit 120 provide the power supply to the external load 600. In this way, by using the controller 140 to detect the voltage across the external load 600 and to control the switch 130 depending on the result of this detection, it is possible to more precisely prevent the current on the external load 600 from getting out of control. As may be appreciated by persons having ordinary skill in the art, the above-described detection method using the controller 140 to detect the voltage across the external load 600 is provided for illustration purposes, and in other embodiments, it is possible to detect other electrical parameters or signals, and indirectly detect the voltage across the load using said other electrical parameters or signals, and these embodiments also fall within the principles and spirit of the present invention.

Those having skill in the art will appreciate that the method for providing the power supply by the power converter can be performed with software, hardware, and/or firmware. For example, if an implementer determines that speed and accuracy are paramount, the implementer may opt for a mainly hardware and/or firmware implementation; alternatively, if flexibility is paramount, the implementer may opt for a mainly software implementation; or, yet again alternatively, the implementer may opt for some combination of hardware, software, and/or firmware. Those skilled in the art will recognize that optical aspects of implementations will typically employ optically oriented hardware, software, and or firmware.

In addition, those skilled in the art will appreciate that each of the steps of the method for providing the power supply by the power converter named after the function thereof is merely used to describe the technology in the embodiment of the present invention in detail, but the present invention is not limited in this regard. Therefore, combining the steps of said method into one step, dividing the steps into several steps, or rearranging the order of the steps is within the scope of the embodiment in the present invention.

In view of the foregoing embodiments of the present invention, many advantages of the present invention are now apparent. The embodiment of the present invention provides a power converter and a method for providing a power supply by the power converter, so as to address the problems faced in the prior art related to the significant size and cost of the power converter when the power required by a load is large.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention, and the scope thereof is determined by the claims that follow.

What is claimed is:

1. A power converter comprising:
   a DC/DC converting circuit configured to provide a variable electric power, which comprises a first output terminal electrically connected to one terminal of an external load and a second output terminal; and
   a first energy storage element comprising:
   a first terminal electrically connected to the second output terminal of the DC/DC converting circuit, and
   a second terminal electrically connected to the other terminal of the external load;
   wherein the power converter provides a power supply for the external load according to the DC/DC converting circuit and the first energy storage element, and the variable electric power is less than the power required by the external load.

2. The power converter according to claim 1, wherein the DC/DC converting circuit further comprises a first input terminal electrically connected to the first terminal of the first energy storage element and a second input terminal electrically connected to the second terminal of the first energy storage element.

3. The power converter according to claim 1, further comprising a second energy storage element, which has a first terminal electrically connected to the first input terminal of the DC/DC converting circuit; and a second terminal electrically connected to the second input terminal of the DC/DC converting circuit.

4. The power converter according to claim 3, wherein the second energy storage element and the first energy storage element are electrically isolated.

5. The power converter according to claim 3, wherein the second terminal of the second energy storage element is electrically connected to the first terminal of the first energy storage element.

6. The power converter according to claim 3, wherein the voltage across the second energy storage element is greater than the voltage across the first energy storage element.

7. The power converter according to claim 3, wherein the second energy storage element is a rechargeable battery or a super capacitor.

8. The power converter according to claim 1, wherein the first energy storage element is a rechargeable battery or a super capacitor.

9. A power converter comprising:
   a DC/DC converting circuit configured to provide a variable electric power, which comprises a first output terminal electrically connected to one terminal of an external load and a second output terminal;
   a first energy storage element comprising:
   a first terminal electrically connected to the second output terminal of the DC/DC converting circuit; and
   a second terminal, and
   a switch comprising:
   a first connecting terminal electrically connected to the second output terminal of the DC/DC converting circuit;
   a second connecting terminal electrically connected to the second terminal of the first energy storage element; and
   a third connecting terminal electrically connected to the other terminal of the external load,
   wherein the power converter provides a two-stage continuous power supply to the external load by the switching operation of the switch.

10. The power converter according to claim 9, wherein when the third connecting terminal and the first connecting terminal of the switch are electrically connected, the power converter provides the power supply to the external load by use of the variable electric power; and when the third connecting terminal and the second connecting terminal of the switch are electrically connected, the power converter provides the power supply for the external load according to the DC/DC converting circuit and the first energy storage element.

11. The power converter according to claim 10, further comprising a controller, the controller comprising:
- a detection terminal electrically connected to the first output terminal of the DC/DC converting circuit, and configured to detect the voltage across the external load; and
- a control terminal electrically connected to the switch, wherein when the voltage across the external load is equal to or greater than a predetermined voltage, the control terminal outputs a control signal to the switch, thereby allowing the second connecting terminal and the third connecting terminal of the switch to be electrically connected; and when the voltage across the external load is less than the predetermined voltage, the control terminal outputs another control signal to the switch, thereby allowing the first connecting terminal and the third connecting terminal of the switch to be electrically connected.

12. The power converter according to claim 9, wherein the first terminal of the first energy storage element is electrically connected to the first input terminal of the DC/DC converting circuit, and the second terminal of the first energy storage element is electrically connected to the second input terminal of the DC/DC converting circuit.

13. The power converter according to claim 9, further comprising a second energy storage element, the second energy storage element comprising:
- a first terminal electrically connected to the first input terminal of the DC/DC converting circuit; and
- a second terminal electrically connected to the second input terminal of the DC/DC converting circuit.

14. The power converter according to claim 13, wherein the second energy storage element and the first energy storage element are electrically isolated.

15. The power converter according to claim 13, wherein the second terminal of the second energy storage element is electrically connected to the first terminal of the first energy storage element.

16. The power converter according to claim 15, wherein the DC/DC converting circuit is a buck circuit comprising:
- a power switch, wherein one terminal thereof is electrically connected to the first terminal of the second energy storage element;
- a first diode, wherein an anode thereof is electrically connected to the second terminal of the second energy storage element, and a cathode thereof is electrically connected to the other terminal of the power switch;
- an inductor, wherein one terminal thereof is electrically connected to the cathode of the first diode;
- a capacitor, wherein one terminal thereof is electrically connected to the other terminal of the inductor, and the other terminal thereof is electrically connected to the second terminal of the second energy storage element; and
- a second diode, wherein an anode thereof is electrically connected to the other terminal of the inductor, and a cathode thereof is electrically connected to the external load.

17. The power converter according to claim 13, wherein the voltage across the second energy storage element is greater than the voltage across the first energy storage element.

18. The power converter according to claim 13, wherein the second energy storage element is a rechargeable battery or a super capacitor.

19. The power converter according to claim 9, wherein the first energy storage element is a rechargeable battery or a super capacitor.

20. A method for providing a power supply by a power converter, the power converter comprising a DC/DC converting circuit and a first energy storage element serially connected to the output terminal of the DC/DC converting circuit, comprising:
- providing a variable electric power through the DC/DC converting circuit;
- providing a switch, of which the first connecting terminal and the third connecting terminal is electrically connected, thereby allowing the DC/DC converting circuit solely to provide the power supply to the external load;
- detecting the voltage across the external load; and
- when the voltage across the external load is equal to or greater than a predetermined voltage, the third connecting terminal of the switch is switched to electrically connect with the second connecting terminal, thereby allowing the DC/DC converting circuit together with the first energy storage element to provide the power supply to the external load.

21. The method according to the claim 20, wherein the first energy storage element is a rechargeable battery or a super capacitor.

* * * * *